(12) United States Patent
Cagenius (10) Patent No.: US 8,024,429 B2
(45) Date of Patent: Sep. 20, 2011

(54) METHOD AND APPARATUS FOR REMOTE ACCESS TO A HOME NETWORK

(75) Inventor: Torbjörn Cagenius, Saratoga, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/523,852

(22) PCT Filed: Jun. 28, 2007

(86) PCT No.: PCT/SE2007/050473
§ 371 (c)(1),
(2), (4) Date: Feb. 25, 2010

(87) PCT Pub. No.: WO2008/088259
PCT Pub. Date: Jul. 24, 2008

(65) Prior Publication Data
US 2010/0191829 A1    Jul. 29, 2010

(51) Int. Cl.
*G06F 15/16* (2006.01)

(52) U.S. Cl. ........ 709/219; 709/221; 709/227; 709/228; 709/229; 370/235

(58) Field of Classification Search .......... 709/219, 709/221, 227–229; 370/235
See application file for complete search history.

(56) References Cited

U.S. PATENT DOCUMENTS

| | | | |
|---|---|---|---|
| 2002/0127995 A1* | 9/2002 | Faccinn et al. | 455/406 |
| 2004/0230659 A1* | 11/2004 | Chase | 709/206 |
| 2005/0108411 A1* | 5/2005 | Kliland et al. | 709/230 |
| 2006/0007954 A1* | 1/2006 | Agrawal et al. | 370/466 |
| 2006/0149845 A1* | 7/2006 | Malin et al. | 709/228 |
| 2006/0242315 A1* | 10/2006 | Nichols | 709/231 |
| 2006/0291412 A1* | 12/2006 | Naqvi et al. | 370/328 |
| 2007/0168466 A1* | 7/2007 | Tooley et al. | 709/218 |
| 2007/0189486 A1* | 8/2007 | Ise | 379/201.12 |
| 2007/0217436 A1* | 9/2007 | Markley et al. | 370/401 |
| 2007/0274233 A1* | 11/2007 | Ptashek et al. | 370/254 |
| 2007/0274327 A1* | 11/2007 | Kaarela et al. | 370/401 |
| 2008/0144615 A1* | 6/2008 | Casey | 370/389 |
| 2008/0291930 A1* | 11/2008 | Damola et al. | 370/401 |
| 2009/0190603 A1* | 7/2009 | Damola et al. | 370/401 |
| 2010/0005154 A1* | 1/2010 | Song et al. | 709/219 |
| 2010/0005177 A1* | 1/2010 | Cagenius | 709/228 |
| 2010/0070636 A1* | 3/2010 | Skog et al. | 709/228 |
| 2010/0131621 A1* | 5/2010 | Zetterlund et al. | 709/221 |
| 2010/0217837 A1* | 8/2010 | Ansari et al. | 709/218 |
| 2010/0223339 A1* | 9/2010 | Cheng et al. | 709/206 |

FOREIGN PATENT DOCUMENTS
WO    WO 2006/045706    5/2006

* cited by examiner

*Primary Examiner* — Alina N. Boutah (57) ABSTRACT

A method and apparatus for establishing a Quality of Service QoS in an access network for a multimedia session between a home network and a remote device located outside the home network. At least one of the remote device and the home network is connected to the access network. When a session invite message is received from the remote device for device discovery in the home network, a default QoS is enforced in the access network. When a session re-invite message is received from the remote device for media communication with a selected home device in the home network, the QoS requirements are determined for the media communication based on session parameters exchanged during the setup of the media communication. An updated QoS is then enforced for the session in the access network based on the determined QoS requirements.

17 Claims, 5 Drawing Sheets

METHOD AND APPARATUS FOR REMOTE ACCESS TO A HOME NETWORK

TECHNICAL FIELD

The present invention relates generally to a method and apparatus for providing remote access from a remote device to devices in a home network, for the communication of media by means of a multimedia gateway in the home network.

BACKGROUND

A multitude of different communication terminals and devices are available today that are capable of packet-based multimedia communication using IP (Internet Protocol), such as fixed or mobile computers and telephones. Multimedia services typically entail transmission of media in different formats and combinations over IP networks. For example, an IP-enabled mobile terminal may exchange audio information as well as visual information with another IP-enabled mobile terminal, or may download media in any format from a content server.

A service and service-delivery control architecture called "IP Multimedia Subsystem" (IMS) has been developed by the $3^{rd}$ Generation Partnership Project (3GPP) as a platform for handling multimedia services and sessions, commonly referred to as the IMS network. Thus, an IMS network can be used to initiate and control multimedia sessions for IMS-enabled terminals connected to different access networks, regardless of access technology. Although conceived primarily to enable multimedia services for mobile IP terminals, the IMS concept can also be used by fixed IP terminals. In ETSI (European Telecommunications Standards Institute), a working group called TISPAN (Telecom and Internet Services and Protocols for Advanced Networks) is currently working with the adoption of IMS in fixed networks.

Multimedia sessions are handled by specific session control nodes in the IMS network, typically including the nodes P-CSCF (Proxy Call Session Control Function), S-CSCF (Serving Call Session Control Function), and I-CSCF (Interrogating Call Session Control Function). An IMS network may also include various application servers for enabling various multimedia services, and a database node HSS (Home Subscriber Server) for storing subscriber and authentication data.

The signalling protocol called "SIP" (Session Initiation Protocol) is typically used for signalling messages during the setup of multimedia sessions in IMS networks. Standard SIP messages can thus be used by IP terminals or devices for establishing multimedia sessions. For example, a terminal can send an SIP message called "SIP INVITE" to initiate a session with another party in a session set-up procedure, e.g. when a multimedia application has been invoked in the terminal.

In SIP, an additional protocol called "SDP" (Session Description Protocol) is used for describing and specifying a multimedia session, and an SDP message can be embedded as a self-contained body within SIP messages. SDP messages are generally used to provide information on device capabilities and media properties, in order to specify and negotiate session parameters for multimedia sessions, as is well-known in the art. The term "session parameters" is used here to represent any device capabilities, media properties and address information necessary to establish a session. The above-mentioned SIP INVITE message and its common response message "SIP 200 OK" typically include an embedded SDP message with information on one or more codecs (coders/decoders) as well as other communication parameters needed for a session, such as an IP address and a port number.

According to 3GPP, a terminal must have an SIM (Subscriber Identity Module) application valid for IMS, generally referred to as "ISIM" (IMS SIM), in order to provide necessary authentication and subscriber data when registering with an IMS network. An ISIM stores an IMS Private Identity "IMPI" and at least one IMS Public Identity "IMPU", which are both known to the IMS network. IMPI is used for authentication and each IMPU is associated with an IMS service profile, typically tied to a user.

It is also desirable to provide IMS-based services for different IP terminals connected to a private network such as a residential or office network, generally referred to as a home network, home LAN (Local Area Network) or local LAN. In this description, the generic term "home network" is used for any such networks, and the term "home device" is used for any IP terminal within the home network.

A home network typically comprises different types of home devices including, e.g., fixed and wireless telephones, computers, media players, servers and television sets. In order to provide IMS services to non-IMS enabled home devices in a home network, a multimedia gateway referred to as a "Home IMS Gateway, HIGA" has been defined that can act as an IMS enabled terminal to access IMS services on behalf of any home device in the home network.

Among other things, the HIGA includes a "Back-to-Back User Agent" (B2BUA) acting basically as a bridge for communications between non-IMS enabled home devices and the IMS network. The B2BUA is equipped with an ISIM application and handles IMS signalling with the IMS network on behalf of the home devices. For example, if a home device sends an SIP REGISTER message containing an SIP identity but no IMS identity, the B2BUA in HIGA will translate the message into an IMS valid REGISTER message containing both an IMPI and an IMPU, according to regular IMS procedures.

Figure 1:
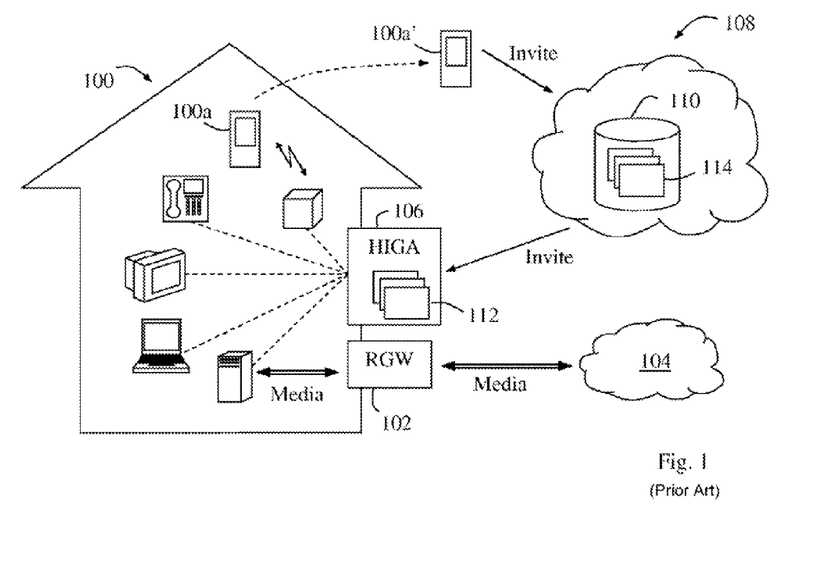
FIG. 1 is a schematic view illustrating a home network when a remote device accesses the home network for the communication of media with a home device, according to the prior art.

In FIG. 1, a home network 100 is shown comprising a plurality of different home devices in a family residence or an office. As illustrated here, these devices include a wireless telephone, a fixed telephone, a TV set, a PC (Personal Computer) and a server. The home network 100 also includes a conventional residential gateway RGW 102 connected to an external access network 104 to provide an external communication link for the devices in network 100. The RGW 104 typically includes an NAT (Network Address Translation) function and a local DHCP (Dynamic Host Configuration Protocol) server providing local IP addresses to the devices valid only within the home network, as is well-known in the art.

The home network 100 further includes an HIGA 106 providing a connection to an IMS network 108 in which an HSS 110 is shown. The HIGA 106 is equipped with suitable interfaces towards the different devices in network 100, using device-adapted protocols. In practice, the HIGA 106 may be physically integrated in the RGW 102 although it is logically considered as an individual functional unit in this description.

In HIGA 106, identity information 112 associated with a profile is stored for each user in network 100, typically the above-mentioned IMPU, valid for accessing IMS network 108 where the same identity information is stored as subscriber information 114 in HSS 110, as indicated in the figure. When a user generally logs on to an IMS network via a specific device, that device's IP address is associated to the users IMPU. Thus, each home device in network 100 has been assigned a local identity that can be associated with a specific IMS identity when a user is logged on to that specific device. WO 2006/045706 outlines how home devices in a home network can obtain IMS services by means of an HIGA using different combinations of IMPI and IMPU.

When a home device in network 100 sends a request for an IMS service to HIGA 106, using a protocol within its capability, HIGA 106 identifies the device by means of its local identity (e.g. the local IP address of the device) and typically retrieves the corresponding IMS identity 112 of the device itself or of the user logged on to that device. Then, HIGA 106 translates the service request into a valid IMS request (e.g. SIP INVITE) on behalf of the device, to set up a session for the device by communicating suitable SIP messages with the IMS network 108, accordingly. In a similar manner, an incoming request for an IMS session with one of the home devices can be set up by HIGA 106 using an IMS identity 112 associated with the device. In either case, the session is routed from/to the device over the RGW 102 to communicate media over the access network 104, as indicated in the figure.

UPnP (Universal Plug-and-Play) is an architecture developed in a multi-vendor collaboration referred to as the UPnP Forum, for establishing standard device protocols for the communication between IP devices in a home network. UPnP thus provides peer-to-peer connectivity between devices in a home network for different access technologies, operating systems, programming languages, format standards and communication protocols used by the devices. Further, UPnP supports a process referred to as "discovery" (or "pairing") in which a device can dynamically join a home network, obtain a local IP address, announce its name and IP address, and exchange capabilities with other home devices. The UPnP Forum is currently in the process of defining an architecture for enabling remote access where remote UPnP devices located outside the private network can communicate media with home devices within the home network.

FIG. 1 further illustrates that a home device 100a moves outside the home network 100 to become a remote device 100a'. The remote device 100a' then sends an INVITE message to the HIGA 106 over the IMS network 108 to initiate media communication with one of the home devices in network 100, requiring that the remote device has a valid IMS identity in order to access the IMS network. In WO 2006/079891 (Nokia), a solution is described for setting up a VPN (Virtual Private Network) tunnel as a data/media transport channel for remote UPnP access, e.g. using IPSec (IP Security).

In order to access a home device remotely, the remote device must have gained knowledge of the home device somehow in a discovery process. The remote device may have taken part in a regular discovery process recently while being located inside the home network 100, typically involving the exchange of certain discovery messages according to a protocol called SSDP (Simple Session Discovery Protocol). If this is not the case, however, such as when the remote device has in fact never been inside the network at all, it is necessary to exchange the discovery messages remotely.

Figure 2:
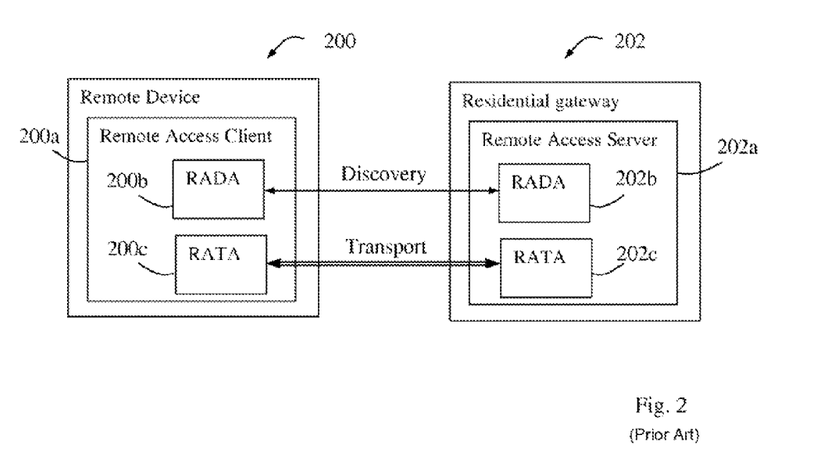
FIG. 2 is a block diagram illustrating remote access features in a remote device and in a residential gateway, according to the prior art.

FIG. 2 illustrates a possible logic structure in a remote device 200 and a residential gateway 202 of a home network for enabling remote access to home devices in the network (not shown). A Remote Access Client RAC 200a has been configured in the remote device 200 and a corresponding Remote Access Server RAS 202a has been configured in the residential gateway 202, which can be done preferably when both are present in the home network since RAC 200a and RAS 202a should be configured with matching profiles.

The remote access client 200a comprises a Remote Access Discovery Agent RADA 200b, and the remote access server 202a comprises a corresponding Remote Access Discovery Agent RADA 202b, configured to exchange discovery messages between the home network and the remote device. The remote access client 200a further comprises a Remote Access Transport Agent RATA 200c and the remote access server 202a comprises a corresponding Remote Access Transport Agent RATA 202c, configured to establish a transport channel for media between the remote device and the remote access server 202a. The RADA function may alternatively be referred to as a "UPnP proxy", and the RATA function may alternatively be referred to as a "connectivity client".

The configuration of RATA 200c, 202c is typically adapted to the characteristics of the used transport channel. When dynamic IP address assignments are used for residential gateways, the well-known solution of dynamic DNS (Domain Name System) can be used to resolve IP addresses of the residential gateway 202.

Additionally, the RADAs 200b, 202b may apply filters or the like to restrict the visibility of the home devices and/or services for the remote device, or vice-versa. Each RADA 200b, 202b may comprise an SSDP Proxy to aggregate information on home devices and services, and a Discovery Agent adapted to synchronize the remote access client 200a and the remote access server 202a.

It is well known that different types of services involving the communication of media have different requirements with respect to the rate and/or latency for the data transport, in order to provide satisfactory results at the receiving end. For example, a conversational service involving real-time communication of voice or video tolerates only very short delays. Further, a streaming service involving the transfer of large amounts of data to be played out simultaneously at the receiving party requires that a certain data rate or bandwidth (sometimes referred to as "throughput") is maintained during the session to avoid interruptions in the play-out, and so forth. Different levels or classes for QoS (Quality of Service) are therefore used of which, e.g., "real-time" guarantees low latency, "streaming" guarantees a certain bandwidth, and "best effort" has no guarantees for latency nor bandwidth whatsoever.

Figure 3:
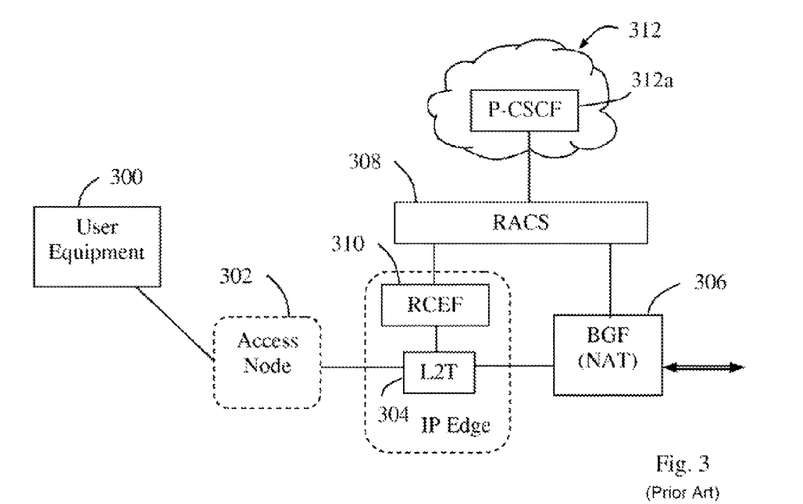
FIG. 3 is a block diagram illustrating a network architecture for providing QoS in a fixed network for IMS sessions, according to the prior art.

FIG. 3 illustrates schematically an architecture for the management of QoS in a fixed network for IMS sessions generally, as specified by TISPAN. A communication terminal referred to as user equipment 300 is attached to a fixed access node 302 in a fixed network. A layer 2 link connects the access node 302 to a suitable layer 2 termination point L2T 304 that constitutes an IP edge in the transition between the layer 2 communication and IP communication in layer 3. L2T 304 is in turn further connected to a gateway for communication with other networks, generally referred to as the "Border Gateway Function BGF" 306, in which an NAT function is typically implemented.

According to TISPAN, the control/management of QoS for IMS sessions is handled by a function called "Resource and Admission Control Subsystem RACS" 308 adapted to establish the QoS for each session which is then enforced at L2T 304 by a "Resource Control Enforcement Function RCEF" 310. RACS 308 is also generally responsible for policy control, resource reservation and admission control for IMS sessions, typically depending on the user. When an IMS session is established by an IMS network 312, e.g. using a P-CSCF node 312a for session control, the required session parameters or media properties are defined in SDP messages as described above, which the P-CSCF node 312a maps into QoS request information to be sent to RACS 308 and enforced by RCEF 310. Any address translation needed for the session in the network is also established in BGF 306 via RACS 308. The current scope of RACS generally covers the access network and the interconnection between different core networks.

However, the problem of providing a suitable or proper Quality of Service QoS for media sessions during remote access to a home network has not yet been addressed. When a remote device accesses a device in a home network to execute a multimedia session, the best effort type of QoS will only be obtained for the session since no QoS enforcement function is present, even though the service used may require a QoS level with higher demands.

SUMMARY

It is an object of the present invention to address the problems outlined above. More specifically, it is an object of the present invention to provide a mechanism for ensuring a relevant QoS for media sessions during remote access to a home network. These objects and others can be obtained by providing methods and arrangements according to the independent claims attached below.

According to one aspect, a method of establishing a QoS in an access network is provided for a multimedia session between a home network and a remote device located outside the home network, wherein at least one of the remote device and the home network is connected to the access network. In the method, a session invite message is received from the remote device for device discovery and optional browsing for media in the home network during a first part of the session. A QoS is then enforced in the access network for the first part of the session. When a session re-invite message is received from the remote device to update the QoS for media communication with a selected home device in the home network during a second part of the session, QoS requirements are determined for the second part of the session based on session parameters for the media communication. An updated QoS is then enforced in the access network for the media communication in the second part of the session to meet the determined QoS requirements.

According to another aspect, a communication device is provided arranged to access a home network acting as a remote device when located outside the home network. At least one of the remote device and the home network is connected to an access network. The remote device comprises a sending unit adapted to send a session invite message to a multimedia gateway in the home network, for device discovery and optional browsing for media in the home network during a first part of a multimedia session, wherein a QoS is enforced in the access network for the first part of the session. The remote device also comprises a determining unit adapted to determine whether the QoS must be updated for media communication with a selected home device in the home network during a second part of the session. The sending unit is further adapted to send a session re-invite message to the multimedia gateway to update the QoS for the media communication with the selected home device, wherein the updated QoS is enforced in the access network for the second part of the session.

According to yet another aspect, a session control node is provided in a multimedia services network, arranged to enable access to a home network for a remote device located outside said home network. At least one of the remote device and the home network is connected to an access network connected to said multimedia services network. The session control node comprises a receiving unit adapted to receive a session invite message from the remote device, directed to the home network, for device discovery and optional browsing for media in the home network during a first part of a session, and further adapted to receive a session re-invite message from the remote device, directed to the home network, for media communication with a selected home device in the home network during a second part of the session. The session control node also comprises a QoS enforcing unit adapted to enforce a QoS in the access network for the first part of the session, and a QoS updating unit adapted to update the QoS for the second part of the session based on session parameters for the media communication. The QoS enforcing unit is further adapted to enforce the updated QoS in the access network for the second session.

Further possible features and benefits of the present invention will be explained in the detailed description below.

BRIEF DESCRIPTION OF THE DRAWINGS

The present invention will now be described in more detail by means of preferred embodiments and with reference to the accompanying drawings, in which.

DETAILED DESCRIPTION

In this description, the term HIGA is used to generally represent a multimedia gateway in a home network connected to an IMS network, and the term UPnP will be used to generally represent the home network architecture. However, the present invention is not limited to these specific terms, nor to any specific protocols and standards referred to in the following.

Briefly described, the present invention can be used to ensure a suitable or needed QoS for multimedia communication with home devices in a home network for a remote device located outside the home network, using an HIGA in the home network. When the remote device initially accesses HIGA in order to perform a discovery process in a session with the home network and, e.g., browse for media content in a home device, a certain QoS for the initial session with HIGA is selected. The QoS may be selected for the initial session by means of session set-up messages exchanged between the remote device and HIGA over an IMS network. A session control node (e.g. P-CSCF) in the IMS network can then determine the QoS needed, based on the exchange of session parameters or media properties between the remote device and HIGA during session setup, typically as SDP messages embedded in an INVITE message from the remote device and also in a 200 OK response message from HIGA.

Alternatively, a default QoS of a relatively low level may be selected that is deemed sufficient for normal signalling and limited exchange of media typically involved with the process of discovery and browsing. For example, the default QoS may be of the best effort type.

In either case, the selected QoS is then enforced in the access network used by the remote device, and also in the access network to which the home network and HIGA is connected. When the discovery process and optional browsing for media is completed and the remote device selects a home device for the communication of media, a new session is established with the home device involving further exchange of session parameters or media properties for the two devices, e.g. in SDP messages. It is then determined whether the QoS must be updated for the new session based on the exchanged session parameters, in other words, if a higher QoS level than the previous one is required in the access networks used. In that case, the new QoS is enforced in the access networks to ensure proper communication of media between the devices during the remote access.

Figure 4:
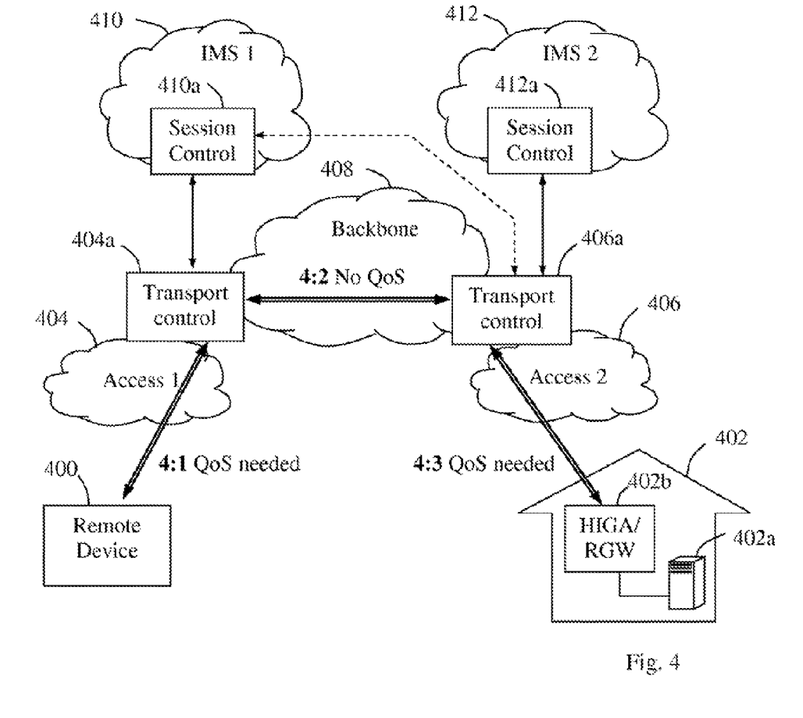
FIG. 4 is a schematic network overview when a suitable or proper QoS is established for a multimedia session between a remote device and a home device in a home network, in accordance with one embodiment.

FIG. 4 is a network overview illustrating how a proper or required QoS can be established for a multimedia session between a remote device 400 and a home device 402a in a home network 402 over an HIGA 402b, according to one embodiment. In this example, the remote device 400 is currently connected to a first access network 404 and the home network 402 is connected to a second access network 406, where networks 404 and 406 can communicate over any intermediate network(s) and communication links generally referred to as a "backbone" network 408 (sometimes also called the transport network). Further, network 404 is connected to a first IMS network 410 and network 406 is connected to a second IMS network 412, although networks 404 and 406 could just as well be connected to the same IMS network.

The interconnection between the remote device 400 and the home network 402 thus involves basically three main communication links for data transport, namely a first link 4:1 over the first access network 404, a second link 4:2 over the backbone network 408 and a third link 4:3 over the second access network 406. Of course, each main link may comprise plural sub-links between different routers and switches.

As indicated in the figure, it is assumed that the first and third links 4:1 and 4:3 over the access networks require the establishment of a proper QoS for the session, whereas the second link 4:2 does not. It is generally considered that access networks constitute "bottlenecks" for data transport having limited transport resources where QoS can be critical, particularly when radio interfaces are involved, while backbone networks are expected to provide transport resources sufficient for any QoS requirements.

The proper QoS can be established for each of the links 4:1 and 4:3 over access networks 404, 406 basically as follows. The remote device 400 initiates a session with HIGA 402b in order to perform a discovery process and optionally browse for media in the home network 402, by sending a session invite message, e.g. SIP INVITE, containing proposed session parameters, e.g. in an embedded SDP message. HIGA 402b then sends a response message, e.g. SIP 200 OK, also containing proposed session parameters, e.g. in an embedded SDP message. These session setup messages pass over a session control node 410a in the first IMS network 410 and over a session control node 412a in the second IMS network 412.

Each session control node 410a, 412a may then initially either select a default QoS for the session deemed sufficient for discovery and optional browsing, or select a proper QoS based on the proposed session parameters included in the SDP of the session setup messages.

In either case, nodes 410a and 412a then sends the selected QoS to transport control functions 404a and 406a in the access networks 404 and 406, respectively, which are generally responsible for setting and enforcing the QoS to allocate resources in the respective access networks for data transport in individual sessions. The term "transport control function" is used here in a general sense and each function 404a, 406a may comprise the above-described nodes RCEF for QoS enforcement and transport resource allocation and BGF for address translation.

When the remote device 400 has performed a discovery process and optional browsing by means of the established session and has selected home device 402a for the communication of media, the remote device 400 sends a session re-invite message to establish a new QoS setting in order to communicate media with the selected home device during a second part of the ongoing session. The QoS update procedure for the second part of the session is similar to the QoS establishment for the initial part of the session, again involving the exchange of session parameters or media properties now reflecting the media properties etc for the communication with the selected device, e.g. in SDP messages. This time, however, the session control nodes 410a, 412a select a proper QoS based on the exchanged session parameters, where the QoS requirements are typically higher than for the initial part of the session since a conversational dialogue and/or the transport of considerable amounts of media data will put higher demands regarding latency and/or bandwidth.

The QoS is then updated for the second part of the session in transport control functions 404a and 406a based on the exchanged session parameters or media properties, and the new QoS is enforced in the access networks to ensure proper communication of media between the devices during the session. If both access networks 404, 406 are connected to the same IMS network, e.g. network 410, a session control node (e.g. P-CSCF) therein will select and implement the QoS in both transport control functions 404a and 406a, as indicated by the dashed two-way arrow.

Figure 5:
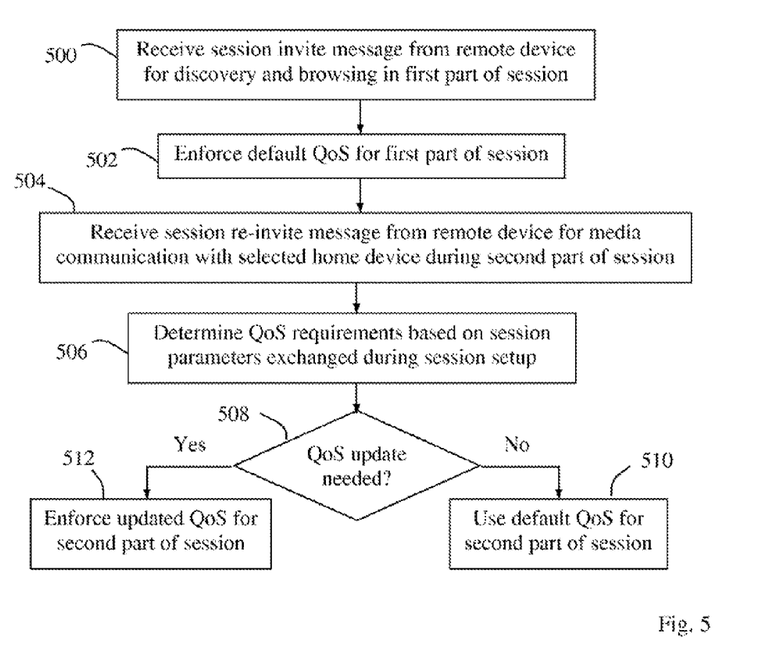
FIG. 5 is a flow chart with steps in a procedure for setting up a multimedia session between a remote device and a home device in a home network, in accordance with another embodiment.

In FIG. 5, a flow chart is shown of a procedure for ensuring a proper QoS in an access network connected to an IMS network, for a multimedia session between a remote device and a home device in a home network, in accordance with another embodiment. It is assumed that the procedure of FIG. 5 can be implemented in one or two access networks to which the remote device and the home network are connected. Thus, the remote device and the home network may be connected to different access networks, which in turn may be connected to separate IMS networks or to the same one, or to the same access network. The description of FIG. 5 below will only refer to one access network to which at least one of the remote device and the home network is connected, even though it may be relevant for two access networks to execute the procedure basically at the same time if applicable.

In a first step 500, a session invite message is received from the remote device for executing a process of device discovery and optional browsing for media during a first part of a session with the home network. The session invite message is actually first received at a session control node (e.g. P-CSCF) in the IMS network, and then at an HIGA in the home network. In a next step 502, the session control node selects a default QoS which is enforced for the session in the access network (at either side if applicable). As mentioned above, it is possible to select a suitable QoS for the session at this point based on exchanged session parameters or media properties, instead of a default one.

When the remote device has executed a discovery process with the home network in the first part of the session and optionally browsed for media content in order to communicate media with a selected home device, a session re-invite message is received from the remote device to update the QoS for media transport in a second part of the session, in a further step 504. Likewise, the re-invite message is received at the IMS session control node and then at the HIGA.

In one embodiment, the remote device may have checked whether the QoS already established initially for the session must be updated due to different QoS requirements for the second part of the session depending on the media properties involved, before sending the session re-invite message. If the previously enforced QoS is sufficient for the media transport during the second part of the session, no session re-invite message is necessary.

In another embodiment, the remote device always sends a session re-invite message including the updated session parameters, when a home device has been selected for media communication. It is then up to the IMS session control node to make the decision whether to update the QoS settings in the access network or not.

Returning to FIG. 5, the QoS requirements for the upcoming media transport are then determined by the IMS session control node, based on session parameters or media properties exchanged between the remote device and the HIGA (on behalf of the home device) contained in the re-invite message and in a response message from HIGA, in a following step 506. As mentioned above, such session parameters or media properties may be contained in SDP messages embedded in the SIP messages INVITE and 200 OK.

Next, it is determined in a step 508 whether the QoS enforced initially for the session needs to be updated for the second part of the session, to ensure proper communication of media between the devices. If not, the default QoS used during the first part of the session is maintained during the second part of the session, in a step 510. However, if it is determined in step 508 that the default QoS is not sufficient or "good enough" for the second part of the session, an updated QoS is selected that satisfies the QoS requirements determined in step 506 above, which is then enforced for media transport during the second part of the session, in a final step 512.

Figure 6:
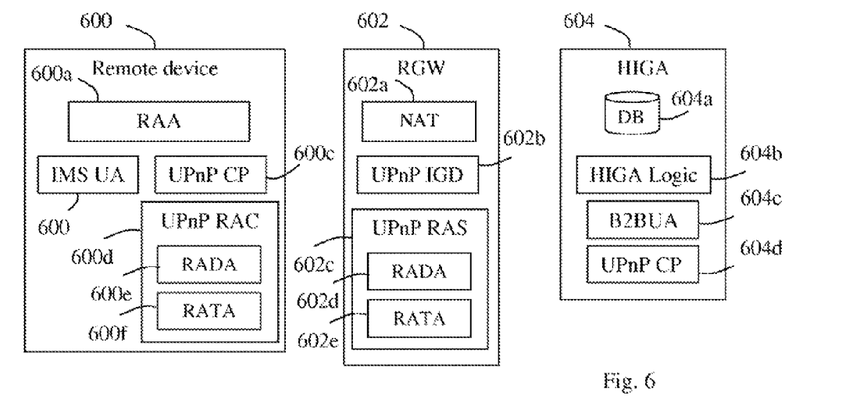
FIG. 6 is a schematic block diagram illustrating functional architectures of a remote device, a residential gateway RGW and a multimedia gateway HIGA, in accordance with another embodiment.

FIG. 6 is a schematic block diagram illustrating an example of how different functions for accomplishing the above-described solution can be implemented, based on the UPnP architecture, in a remote device 600 on one side, and in a residential gateway RGW 602 and a multimedia gateway HIGA 604 of a home network on the other side. The multimedia gateway HIGA 604 is connected to an IMS network, not shown, and both HIGA 604 and the remote device 600 have been registered as IMS clients. It should be noted that FIG. 6 illustrates the different structures purely logically, and the skilled person will be able to implement these functions in practice by means of any suitable hardware and software.

The remote device 600 comprises a Remote Access Application RAA 600a for communicating remotely with home devices in the home network. When outside the home network, an IMS UA (User Agent) 600b is generally used for accessing IMS services. In this context, IMS UA 600b is also used to obtain connection parameters of the RGW 602 (e.g. a routable IP address/port number combination) when communicating with home devices in the home network.

The remote device 600 further comprises a UPnP protocol stack that incorporates a UPnP CP (Control Point) 600c for controlling UPnP devices and a UPnP Remote Access Client (RAC) 600d for obtaining connectivity and access with the home network remotely. Within the UPnP RAC 600d, a RADA 600e is used to synchronize UPnP discovery messages between the remote device and the home network, and a RATA 600f is used to establish a connection based on the IP address of the RGW 602, which can be retrieved by means of regular SIP messages over IMS. The remote device 600 may also comprise a UPnP DMR (Digital Media Renderer), not shown, for handling received media.

The RGW 602 comprises standard residential gateway functions such as a NAT function 602a and a UPnP Internet Gateway Device IGD 602b, for controlling the NAT IP address and port mapping. The RGW 602 further comprises a UPnP Remote Access Server (RAS) 602c, likewise including a RADA 602d and a RATA 602e, to enable remote access for remote devices including device 600.

The HIGA 604 comprises a device database (DB) 604a containing private IP addresses of home devices in the home network, and where home device information also can be gathered in a discovery process. The discovery information of home devices stored in DB 604a may also include names and capabilities of the home devices. The HIGA 604 further comprises an HIGA logic function 604b, a B2BUA 604c (having an ISIM application) for communications between home devices and the IMS network, and a UPnP CP 604d for managing local UPnP devices in the home network, e.g. the NAT 602a in the RGW 602.

Figure 7:
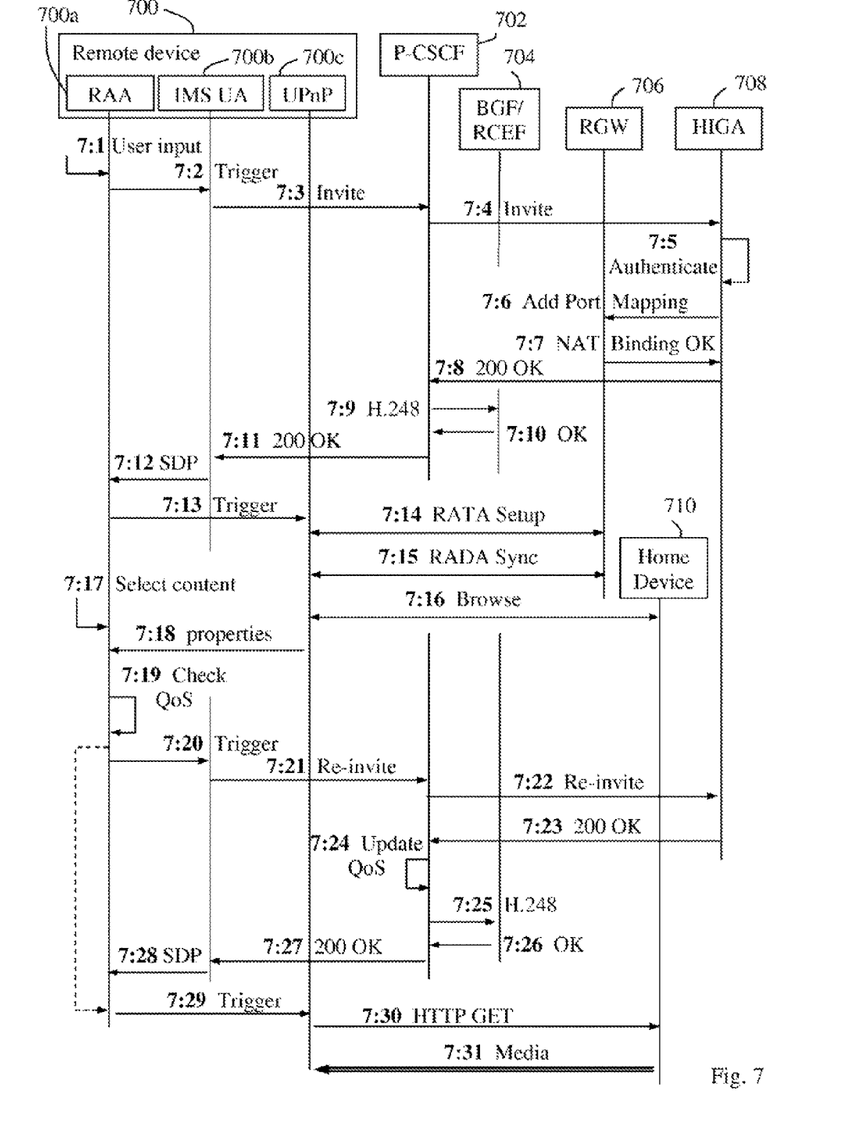
FIG. 7 is a signalling diagram illustrating how the inventive solution for ensuring a certain QoS when a remote device communicates media with a home device in a home network can be implemented, in accordance with another embodiment.

FIG. 7 illustrates in more detail how a signalling procedure between different nodes and components can be implemented according to further embodiments, to achieve a proper QoS for a multimedia session between a remote device 700 and a home device 702 located in a home network. The nodes involved further comprises a session control node P-CSCF 702 located in an IMS network, a transport control function BGF/RCEF 704 located in an access network, as well as a residential gateway RGW 706, a multimedia gateway HIGA 708 and a home device 710, all three located in the home network.

In this context, the functions P-CSCF 702 and BGF/RCEF 704 are basically equivalents of the session control node (410a, 412a) and the transport control function (404a, 406a) described for FIG. 4 above, respectively. In FIG. 7, it is assumed that only one access network and only one IMS network are involved, although the present example can be valid also for the case when two access networks and even two IMS networks are involved, i.e. when the remote device and the home network are connected to different access networks served by different IMS networks, as described above. In this signalling scheme, the functions P-CSCF 702 and BGF/RCEF 704 are then duplicated to act in each access/IMS network, respectively.

Again, it is a pre-condition that both the remote device 700 and the HIGA 708 have been registered as IMS clients. The remote device 700 comprises an RAA 700a, an IMS UA 700b and a UPnP function 700c in which a Remote Access Client RAC is implemented, basically as the corresponding functions shown in FIG. 6. Correspondingly, the RGW 706 also comprises a UPnP function (not shown) in which a Remote Access Server RAS is implemented, basically as shown in FIG. 6. Alternatively, the UPnP function and RAS may reside in the HIGA 708, although the present example illustrates otherwise. The shown signalling steps will now be briefly described below.

Step 7:1—A user wanting to access a device in the home network from the remote device 700 activates the RAA 700a by means of a suitable input command.

Step 7:2—RAA 700a triggers the IMS UA 700b to send an IMS-based session invite message SIP INVITE directed to an IMPU of the HIGA 708. An SPD message embedded in the SIP INVITE message may or may not include information on desired media properties, generally referred to above as session parameters.

Step 7:3—In response thereto, IMS UA 700b issues the SIP INVITE message which is first received by the P-CSCF node 708 in the IMS network.

Step 7:4—the P-CSCF node 708 forwards the INVITE message to HIGA 708, which is received and handled by a B2BUA (not shown) in HIGA 708. The SPD message embedded in the SIP INVITE message contains an IP address and a port number used by the remote device 700.

Step 7:5—The B2BUA in HIGA 708 authenticates the user by comparing an IMS user identity of the remote device included in the SIP INVITE message, with identities of allowed users that have been pre-stored in the HIGA 708. For example, the SIP INVITE header may include a so-called P-Asserted-Identity as the IMS user identity.

Step 7:6—An NAT binding is requested in the RGW 706, using a UPnP CP (not shown) in HIGA 708, for the IP address and port number of the remote device 700 and the local address of UPnP RAS in RGW 706 (or alternatively in HIGA 708).

Step 7:7—A UPnP IGD (not shown) in the RGW 706 confirms the NAT binding.

Step 7:8—The B2BUA in HIGA 708 sends an SIP 200 OK message towards the remote device 700 with the obtained NAT binding information including the IP address and port number of the UPnP RAS in RGW 706. The SIP 200 OK message is first received by the P-CSCF node 702.

Step 7:9—The P-CSCF node 702 extracts SDP parameters relevant for establishing a so-called "pin-hole" in the BGF 704 (which is basically a connection through the BGF), and determines initial QoS policy settings to support the service referred to as "UPnP remote access signalling", i.e. a first part of a session for performing a discovery process and optionally browsing for media, as described above. The P-CSCF node 702 then sends a standard H.248 message to the BGF/RCEF function 704 (e.g. via the RACS function shown in FIG. 3), containing QoS/policy settings and IP addresses for pin-hole establishment, effectively enforcing the QoS necessary for the discovery process. Preferably, a default QoS is selected for the first part of the session, as described above. This step could be performed by two P-CSCF nodes in parallel if two IMS networks are involved, based on a user service profile in each respective IMS network.

Step 7:10—The BGF/RCEF function 704 responds (e.g. by means of the RACS function) with a confirmation message to the P-CSCF node 702.

Step 7:11—The P-CSCF node 702 forwards the SIP 200 OK message received in step 7:8 to the IMS UA 700b in the remote device 700, which thus contains the embedded SDP message with NAT binding information including the IP address and port number to be used for accessing the UPnP RAS in RGW 706.

Step 7:12—IMS UA 700b transfers the received SDP information to the RAA 700a.

Step 7:13—The RAA 700a initiates or triggers UPnP RATA in the RAC of UPnP function 700c to establish remote access with the home network.

Step 7:14—The UPnP RATA in the RAC of UPnP function 700c and the UPnP RATA in the RAS of RGW 706 establish a VPN tunnel (e.g. IPSec) between the remote device 700 and the RGW 706, using the IP address and port number received in the SDP of step 7:11-12.

Step 7:15—After successful VPN tunnel establishment, the UPnP RADA of UPnP function 700c can synchronize with the corresponding UPnP RADA in the RAS of RGW 706 (alternatively in HIGA 708), to discover devices and services on the home network by performing a discovery process during the first part of the session as described above.

Step 7:16—A UPnP CP in the UPnP function 700c of remote device 700 now selects a home device 710 and browses for content available in the selected device. This can be done, e.g., by using the UPnP ContentDirectory Browse action. With the BrowseFlag set to BrowseMetadata, the Result response from the selected UPnP device will then include media properties of the browsed content, e.g. Item type: imageItem, audioItem or videoItem as well as size and bit rate of the encoding of the selected content.

Step 7:17—The user now selects content/service to be retrieved from home device 710 in a second part of the session, by means of a suitable input command.

Step 7:18—the RAC in UPnP function 700c informs the RAA 700a regarding the relevant media properties of the selected content that will impact the QoS decision, e.g. media type, size and bit rate of the encoding of the selected content, which has been retrieved in step 7:16.

Step 7:19—The RAA 700a compares the media properties with the SDP information received in step 7:12 which was also used to setup the VPN connection in step 7:14. If the media properties of the selected content are significantly different from the received SDP information, the default QoS selected and enforced in step 7:9 for the VPN connection of the session must be updated/modified to ensure proper media transport during the second part of the session. Based on the UPnP parameters received in step 7:18, the update decision can be triggered by, e.g., media type being videoItem or in combination with a size and/or bit rate of the encoding.

Step 7:20—The RAA 700a triggers an SIP RE-INVITE message to be sent to HIGA 708, with an SPD message containing at least the present media properties based on the selected media content. The UPnP parameters given as examples in step 7:18 and 7:19, will then be mapped to corresponding media and attribute description (m= and a=) lines in the SDP message.

Step 7:21—The SIP RE-INVITE message is sent from the IMS UA 700b towards HIGA 708, which is first received by the P-CSCF node 702.

Step 7:22—The SIP RE-INVITE message is forwarded to HIGA 708 by the P-CSCF node 702.

Step 7:23—The B2BUA in HIGA 708 returns an SIP 200 OK message to the P-CSCF node 702. HIGA 708 may use the information in the SDP message with updated media properties to apply any QoS settings in the home network, if needed.

Step 7:24—The P-CSCF node 702 determines a new QoS by extracting SDP parameters that are relevant for QoS policy settings, such as media type, bandwidth requirements, and information on IP address and port number.

Step 7:25—Accordingly, the P-CSCF node 702 updates the QoS/policy settings in the RCEF 704 (via RACS) by sending an H.248 message thereto, effectively enforcing the QoS necessary for the forthcoming media transport during the second part of the session, as similar to the message sent in step 7:9. This step could be performed by two P-CSCF nodes in parallel if two IMS networks are involved, based on a user service profile in each respective IMS network.

Step 7:26—The BGF/RCEF function 704 responds (e.g. by means of the RACS function) with a confirmation message to the P-CSCF node 702, as similar to step 7:10.

Step 7:27—The P-CSCF node 702 forwards the SIP 200 OK message received in step 7:23 to the IMS UA 700b in the remote device 700, which thus contains the embedded SDP message, as similar to step 7:11.

Step 7:28—IMS UA 700b transfers the received SDP information to the RAA 700a, as similar to step 7:12.

Step 7:29—The RAA 700a then triggers the UPnP CP in the UPnP function 700c to send an HTTP GET command to fetch or download the selected media from the home device 710.

Step 7:30—The UPnP CP in the UPnP function 700c sends the HTTP GET command to home device 710.

Step 7:31—The selected media is finally downloaded in the second part of the session, e.g. by means of a streaming application, from the home device 710 to the remote device 700 using the UPnP function 700c. During this step, the necessary QoS is guaranteed during transfer over the access network, as a result of the QoS enforcement in step 7:25. As mentioned above, the QoS enforcement can be made simultaneously in two access networks when applicable.

The example described above for FIG. 7 concerns the case where the remote device fetches or downloads media from a home device in the home network, e.g. a media server. However, the shown procedure may as well be applied for communication in either direction, such as when transferring media from the remote device to a home device, or during a dialogue session involving media transport in both directions, and so forth. Thus, the described procedure involving the browsing for media and fetching media from the home device would then be somewhat different, as can be readily understood by a person skilled in the art.

Figure 8:
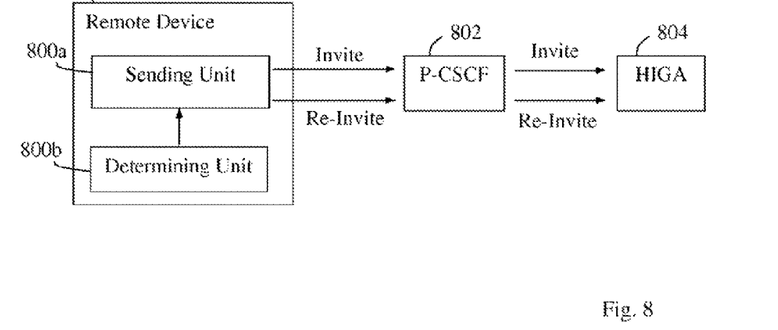
FIG. 8 is a schematic block diagram illustrating a remote device, in accordance with yet another embodiment.

FIG. 8 is a schematic block diagram illustrating a remote device 800 arranged to access a home network (not shown) when located outside the home network, e.g. in a procedure as described above for FIGS. 4, 5 and 7. At least one of the remote device and the home network is connected to an access network (not shown) where a QoS can be enforced.

The remote device 800 comprises a sending unit 800a adapted to send a session invite message to a multimedia gateway 804 in the home network, for device discovery and optional browsing for media in the home network during a first part of a multimedia session. A QoS is then enforced in the access network for the first part of the session, basically as described above. The multimedia gateway 804 may be an HIGA, as indicated in the figure.

The remote device 800 further comprises a determining unit 800b adapted to determine whether the QoS must be updated for media communication with a selected home device in the home network during a second part of the session. The sending unit 800a is further adapted to send a session re-invite message to the multimedia gateway to update the QoS for the media communication with the selected home device. The updated QoS is then enforced in the access network for the second part of the session, basically as described above.

The determining unit 800b may be further adapted to determine whether the QoS must be updated for the media communication during the second part of the session, based on media properties of the media communication.

Figure 9:
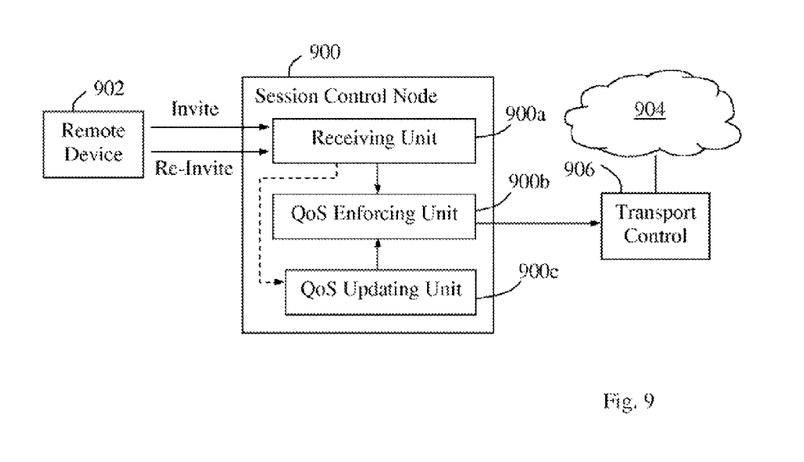
FIG. 9 is a schematic block diagram illustrating a session control node, in accordance with yet another embodiment.

FIG. 9 is a schematic block diagram illustrating a session control node 900 in a multimedia services network, arranged to enable access to a home network (not shown) for a remote device 902 located outside said home network, e.g. in a procedure as described above for FIGS. 4, 5 and 7. At least one of the remote device and the home network is connected to an access network 904 where a QoS can be enforced by means of a transport control node 906.

The session control node 900 comprises a receiving unit 900a adapted to receive a session invite message from the remote device 902, directed to the home network, for device discovery and optional browsing for media in the home network during a first part of a session.

The session control node 900 further comprises a Quality of Service QoS enforcing unit 900b adapted to enforce a QoS in the transport control node 906 of the access network 904 for the first part of the session.

The receiving unit 900a is further adapted to receive a session re-invite message from the remote device 902, directed to the home network, for media communication with a selected home device in the home network during a second part of the session.

Session control node 900 finally comprises a QoS updating unit 900c adapted to update the QoS for the second part of the session based on session parameters for the media communication, wherein the QoS enforcing unit 900b is further adapted to enforce the updated QoS in the transport control node 906 of the access network 904 for the second session.

The session control node 900 may be a P-CSCF node in an IMS network being the multimedia services network. The QoS enforcing unit 900b may be further adapted to select the QoS for the first part of the session as a default QoS or based on session parameters exchanged during setup of the first part of the session.

The QoS updating unit 900c may be further adapted to extract the session parameters for the second part of the session from SPD messages embedded in the session re-invite message from the remote device and/or in a response message from the home network. The exchanged session parameters may indicate device capabilities and/or media properties. The transport control node may comprise an RCEF function.

FIGS. 8 and 9 illustrate various viable logic functional units in a remote device 800 and a session control node 900, respectively, in which the present invention can be used. However, the skilled person should be able to implement the described functions therein without limitation to the specific shown structures, using suitable software and hardware.

The above-described embodiments can thus be used for establishing a suitable or proper QoS which is adapted to provide satisfactory results in the communication of media between a remote device and a home device in a home network, e.g. depending on the application and/or equipment used and the media being communicated.

While the invention has been described with reference to specific exemplary embodiments, the description is in general only intended to illustrate the inventive concept and should not be taken as limiting the scope of the invention. Although the concepts of IMS, HIGA and UPnP have been used throughout when describing the above embodiments, any other standards and network elements for enabling multimedia communication may basically be used. For example, SIP may be used as a general signalling protocol regardless of whether the standards of IMS, TISPAN and/or UPnP are used or not. The present invention is generally defined by the following independent claims.

The invention claimed is:

1. A method of establishing a Quality of Service QoS in an access network for a multimedia session between a home network and a remote device located outside said home network, wherein at least one of said remote device and home network is connected to said access network, comprising the following steps:
   receiving a session invite message from the remote device for device discovery and optional browsing for media in the home network during a first part of the session, enforcing a QoS in the access network for the first part of the session,
   receiving a session re-invite message from the remote device to update the QoS for media communication with a selected home device in the home network during a second part of the session,
   determining QoS requirements for the second part of the session based on session parameters for said media communication, and
   enforcing an updated QoS in the access network for the media communication in the second part of the session to meet the determined QoS requirements.

2. A method according to claim 1, wherein the QoS for the first part of the session is selected as a default QoS or based on session parameters exchanged during setup of the first part of the session.

3. A method according to claim 1, wherein said session parameters for the second or first part of the session are extracted from SPD messages embedded in said session invite/re-invite message from the remote device and/or in a response message from the home network.

4. A method according to claim 1, wherein said exchanged session parameters indicate device capabilities and/or media properties.

5. A method according to claim 1, wherein the QoS requirements are determined for the second session and the QoS is updated by a session control node in a multimedia services network to which said access network is connected.

6. A method according to claim 5, wherein the multimedia services network is an IMS network and the session control node is a P-CSCF node.

7. A method according to claim 1, wherein the QoS is enforced in a transport control node in the access network.

8. A method according to claim 7, wherein the transport control node comprises an RCEF function.

9. A communication device for accessing a home network acting as a remote device when located outside said home network, wherein at least one of said communication device and home network is connected to an access network, comprising:
   a memory:
   a processor;
   a sending unit for sending a session invite message, using the processor, to a multimedia gateway in the home network, for device discovery and optional browsing for media in the home network during a first part of a multimedia session, wherein a Quality of Service QoS is enforced in the access network for the first part of the session, and
   a determining unit for determining, using the processor, whether the QoS must be updated for media communication with a selected home device in the home network during a second part of the session, wherein the sending unit sends a session re-invite message to said multimedia gateway to update the QoS for the media communication with the selected home device, wherein the updated QoS is enforced in the access network for the second part of the session.

10. A communication device according to claim 9, wherein the determining unit determines, using the processor, whether the QoS must be updated for the media communication during the second part of the session, based on media properties of the media communication.

11. A session control node in a multimedia services network for enabling access to a home network for a remote device located outside said home network, wherein at least one of said remote device and home network is connected to an access network connected to said multimedia services network, comprising:
   a memory:
   a processor;
   a receiving unit for receiving a session invite message, using the processor, from the remote device, directed to the home network, for device discovery and optional browsing for media in the home network during a first part of a session, and receiving a session re-invite message from the remote device, directed to the home network, for media communication with a selected home device in the home network during a second part of the session,
   a Quality of Service QoS enforcing unit for enforcing, using the processor, a QoS in the access network for said first part of the session, and
   a QoS updating unit for updating, using the processor, the QoS for said second part of the session based on session parameters for said media communication, wherein the QoS enforcing unit enforces the updated QoS in the access network for the second session.

12. A session control node according to claim 11, wherein the session control node is a P-CSCF node and the multimedia services network is an IMS network.

13. A session control node according to claim 11, wherein the QoS enforcing unit selects, using the processor, the QoS for the first part of the session as a default QoS or based on session parameters exchanged during setup of the first part of the session.

14. A session control node according to claim 11, wherein the QoS updating unit extracts, using the processor, said session parameters for the second part of the session from SPD messages embedded in said session re-invite message from the remote device and/or in a response message from the home network.

15. A session control node according to claim 11, wherein said exchanged session parameters indicate device capabilities and/or media properties.

16. A session control node according to claim 11, wherein the QoS enforcing unit enforces, using the processor, the QoS in a transport control node in the access network.

17. A session control node according to claim 16, wherein the transport control node comprises an RCEF function.

* * * * *